United States Patent
Lee

(10) Patent No.: US 11,999,395 B2
(45) Date of Patent: Jun. 4, 2024

(54) VEHICLE DRIVING ASSISTANCE METHOD, ONBOARD DEVICE, AND VEHICLE HAVING ONBOARD DEVICE

(71) Applicant: TRIPLE WIN TECHNOLOGY(SHENZHEN) CO.LTD., Shenzhen (CN)

(72) Inventor: Tzong-Yi Lee, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 758 days.

(21) Appl. No.: 17/125,569

(22) Filed: Dec. 17, 2020

(65) Prior Publication Data

US 2022/0169294 A1   Jun. 2, 2022

(30) Foreign Application Priority Data

Dec. 2, 2020 (CN) .......................... 202011402748.6

(51) Int. Cl.
| | |
|---|---|
| G08G 1/052 | (2006.01) |
| B61L 15/00 | (2006.01) |
| B61L 25/02 | (2006.01) |
| B61L 27/04 | (2006.01) |
| G06F 18/214 | (2023.01) |
| G06F 18/24 | (2023.01) |
| G06T 7/11 | (2017.01) |
| G06T 7/64 | (2017.01) |
| G06V 20/58 | (2022.01) |
| B61L 25/00 | (2006.01) |

(52) U.S. Cl.
CPC .......... *B61L 25/021* (2013.01); *B61L 15/009* (2013.01); *B61L 27/04* (2013.01); *G06F 18/214* (2023.01); *G06F 18/24* (2023.01); *G06T 7/11* (2017.01); *G06T 7/64* (2017.01); *G06V 20/582* (2022.01); *B61L 2205/04* (2013.01); *G06T 2207/20132* (2013.01); *G06T 2207/30252* (2013.01)

(58) Field of Classification Search
CPC ........ B60W 30/14; G08G 1/052; B61L 25/02; B61L 25/00; G06K 9/00; G06K 9/62
See application file for complete search history.

(56) References Cited

U.S. PATENT DOCUMENTS

| | | | | |
|---|---|---|---|---|
| 2008/0137908 | A1* | 6/2008 | Stein | G06V 20/582 |
| | | | | 382/103 |
| 2012/0046855 | A1* | 2/2012 | Wey | G08G 1/09623 |
| | | | | 701/117 |
| 2016/0342850 | A1* | 11/2016 | Elimalech | G08G 1/163 |
| 2016/0356880 | A1* | 12/2016 | Negussu | G01S 7/022 |
| 2019/0236382 | A1* | 8/2019 | Hall | G01C 21/3469 |

(Continued)

FOREIGN PATENT DOCUMENTS

| | | |
|---|---|---|
| CN | 101326555 A | 12/2008 |
| CN | 102682609 | 9/2012 |

(Continued)

*Primary Examiner* — Tan Q Nguyen
(74) *Attorney, Agent, or Firm* — ScienBiziP, P.C.

(57) ABSTRACT

A vehicle driving assistance method includes detecting a speed of a vehicle, obtaining a speed limit of the vehicle in a corresponding section of road based on images when the speed of the vehicle exceeds the speed threshold, and issuing a warning when the speed of the vehicle exceeds the speed limit of the vehicle in the corresponding section of road.

9 Claims, 2 Drawing Sheets

(56) References Cited

U.S. PATENT DOCUMENTS

2020/0211226 A1* 7/2020 Kundu .................. G06T 7/85
2021/0287538 A1* 9/2021 Zhang ................ G06V 20/582

FOREIGN PATENT DOCUMENTS

| CN | 206097221 | 4/2017 |
| CN | 107010063 | 8/2017 |
| CN | 109102711 | 12/2018 |
| CN | 110562257 A | 12/2019 |
| TW | M498868 U | 4/2015 |

* cited by examiner

VEHICLE DRIVING ASSISTANCE METHOD, ONBOARD DEVICE, AND VEHICLE HAVING ONBOARD DEVICE

FIELD

The subject matter herein generally relates to vehicle driving assistance methods, and more particularly to a vehicle driving assistance method, an onboard device, and a vehicle having the onboard device.

BACKGROUND

Railway vehicles, such as trains, may derail as a result of running at high speeds. How to effectively control vehicle speed and ensure driving safety is a very important research direction in vehicle control.

BRIEF DESCRIPTION OF THE DRAWINGS

Implementations of the present disclosure will now be described, by way of embodiments, with reference to the attached figures.

DETAILED DESCRIPTION

Figure 1:
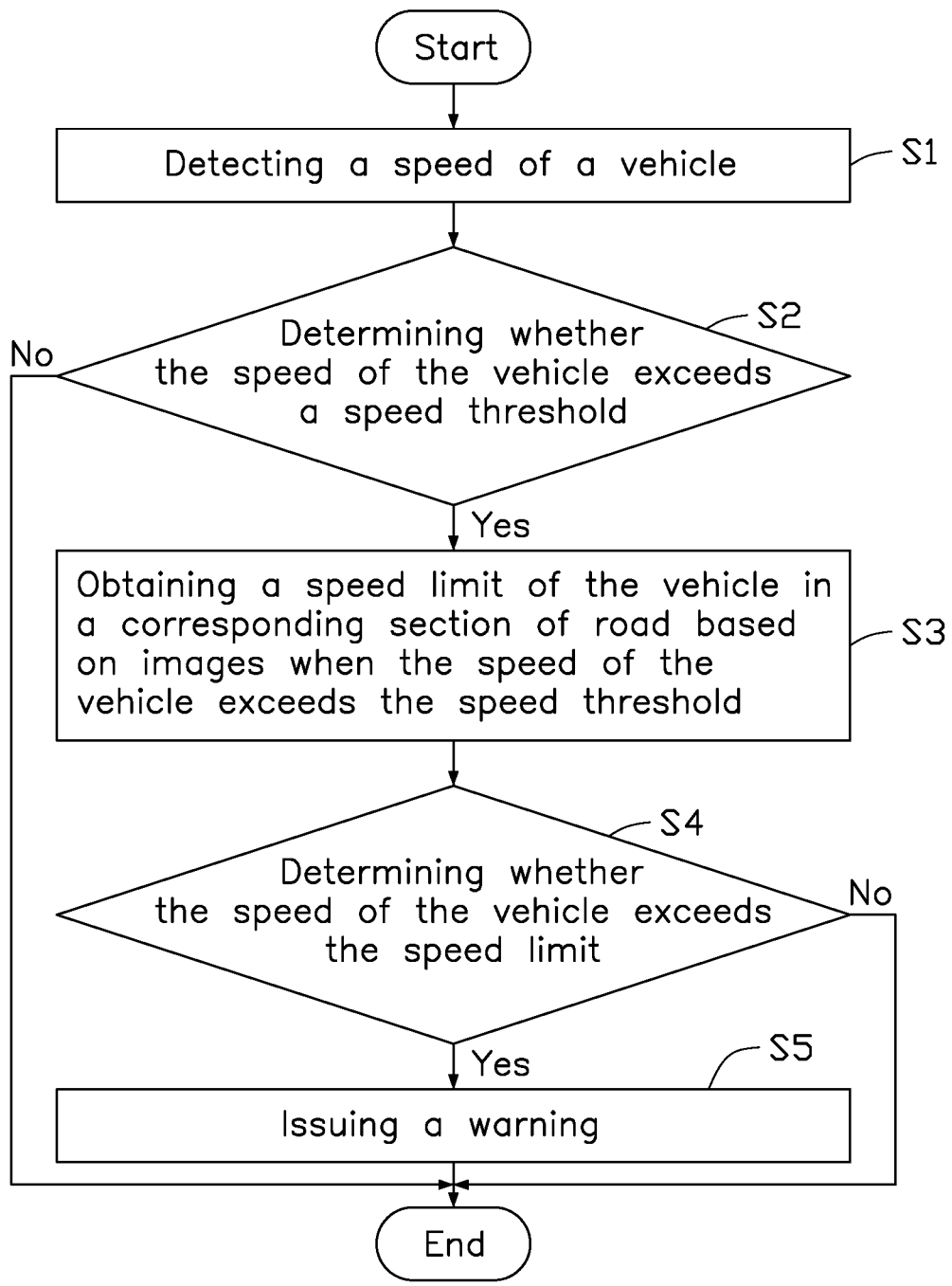
FIG. 1 is a flowchart of a vehicle driving assistance method according to an embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
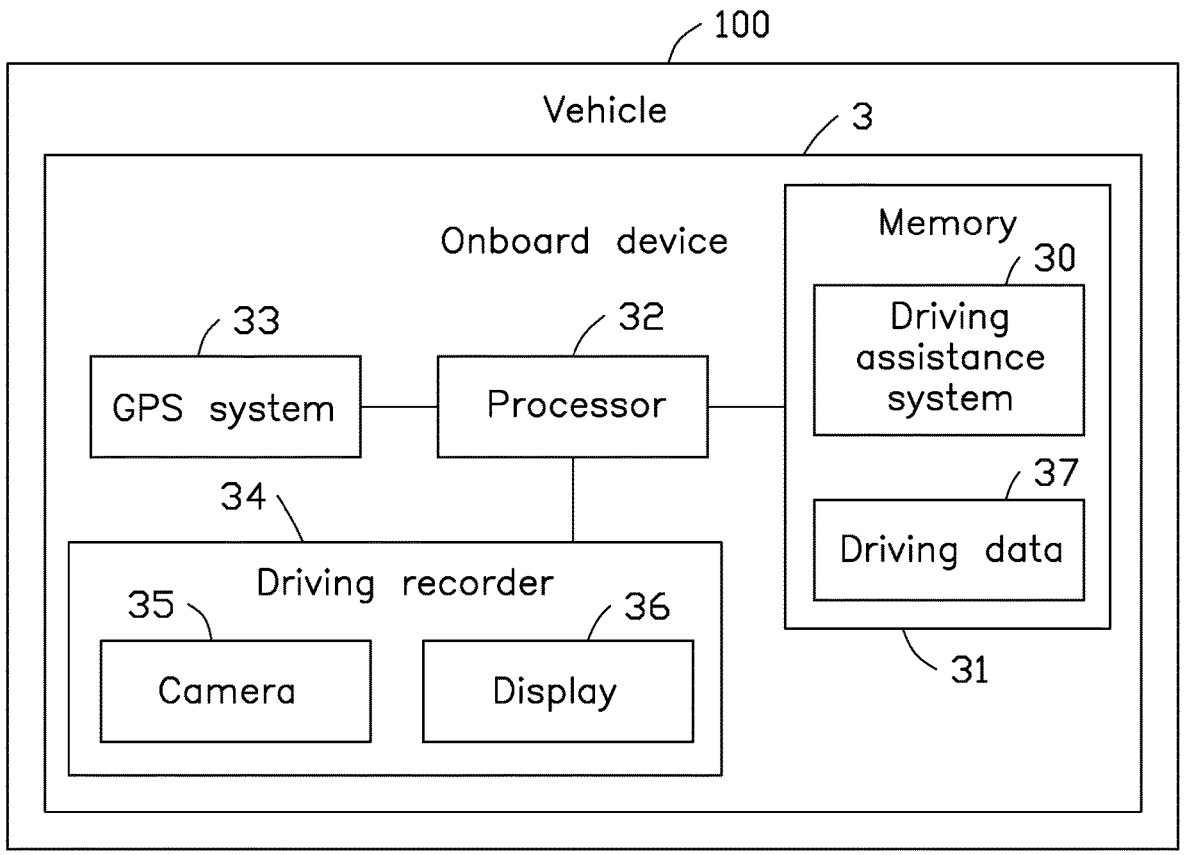
FIG. 2 is a schematic block diagram of a vehicle having an onboard device according to an embodiment of the present application.

FIG. 2 shows a structural diagram of an embodiment of a onboard device 3. The onboard device 3 includes a memory 31, at least one processor 32, a global positioning system (GPS) system 33, and a driving recorder 34. The memory 31, the at least one processor 32, the GPS system 33, and the driving recorder 34 are electrically coupled to each other.

A structure of the onboard device 3 shown in FIG. 2 is only an exemplary description, and does not constitute a limitation to the various embodiments of the present application. The onboard device 3 may also include more or less hardware or software than those shown in FIG. 2 or have different component configurations.

In one embodiment, the memory 31 may be used to store program codes and various data of a computer program. For example, the memory 31 may be used to store driving data 37 recorded by a driving assistance system 30 and a driving recorder 34 installed in the onboard device 3 to realize high-speed and automatic storage of programs or data during operation of the onboard device 3. The memory 31 may include a read-only memory (ROM), a programmable read-only memory (PROM), an erasable programmable read-only memory (EPROM), a one-time programmable read-only memory (OTPROM), an electronically-erasable programmable read-only memory (EEPROM), a compact disc read-only memory (CD-ROM), or other optical disk storage, magnetic disk storage, tape storage, or any other non-volatile computer-readable storage medium that can be used to carry or store data.

In one embodiment, the at least one processor 32 may be composed of an integrated circuit. For example, the integrated circuit can be composed of a single packaged integrated circuit, or it can be composed of multiple integrated circuits with the same function or different functions, including one or more central processing units (CPU), microprocessors, combinations of digital processing chips, graphics processors, and various control chips. The at least one processor 32 is a control core of the onboard device 3, which uses various interfaces and lines to connect various components of the entire onboard device 3, and executes programs or instructions stored in the memory 31 and calls data stored in the memory 31 to execute various functions and processing data of the onboard device 3 (see FIG. 1 for details).

In one embodiment, the GPS system 33 can be used to detect a speed of the vehicle 100. For example, the GPS system 33 can use a receiver antenna to receive GPS signals from a GPS satellite to determine a trajectory of the GPS satellite relative to the Earth. The receiver antenna uses the GPS signals to measure status parameters of the vehicle 100 in real time, such as an instantaneous three-dimensional position and a three-dimensional velocity.

In one embodiment, the driving recorder 34 includes a camera 35 and a display 36. The driving recorder 34 can use the camera 35 to capture images of an entire driving process of the vehicle 100, and the images are processed by the processor 32 and stored as the driving data 37 in the memory 31. After the driving recorder 34 receives the images taken by the camera 35 or speeding warning information transmitted by the processor 32, the driving recorder 34 displays corresponding information on the display 36.

In one embodiment, the camera 35 may be installed at a position where a front windshield of the vehicle 100 is located, as long as the camera 35 can capture images of speed limit signs and images during the entire driving process.

In one embodiment, the display 36 may be a display device capable of displaying the images captured by the camera 35 and outputting sounds, such as issuing an overspeed warning when the vehicle 100 speed exceeds a speed limit.

In one embodiment, the speed limit signs convey speed limit information to a vehicle driver as the vehicle 100 moves in a forward direction. It should be noted that a style, location, and speed limit information of the speed limit signs are specifically determined according to a corresponding section of track or a road where the vehicle 100 is located.

In one embodiment, the images are images of a track located in a corresponding section of road in the forward direction of the vehicle 100.

In one embodiment, the driving assistance system 30 is a program made up of a plurality of instructions stored in the memory 31 and executed by the at least one processor 32 to realize functions of providing driving assistance for the vehicle 100 (refer to FIG. 1 for details).

In one embodiment, the memory 31 stores program codes of a computer program, and the at least one processor 32 can call the program codes stored in the memory 31 to perform related functions to provide driving assistance for the vehicle 100.

FIG. 1 is a flowchart of a vehicle driving assistance method according to an embodiment of the present application.

In one embodiment, the vehicle driving assistance method can be applied to the vehicle 100. The functions for providing driving assistance implemented by the method can be directly integrated in the vehicle 100 or implemented on the onboard device 3 in the form of a software development kit (SDK).

As shown in FIG. 1, the vehicle driving assistance method specifically includes the following blocks. According to different requirements, the order of the blocks in the flowchart can be changed, and some blocks can be omitted or combined.

At block S1, the onboard device 3 detects the speed of the vehicle 100.

In one embodiment, the onboard device 3 may use the GPS system 33 to detect the speed of the vehicle 100.

In other embodiments, the onboard device 3 may also use a speed sensor (not shown) to detect the speed of the vehicle 100. The speed sensor is installed on the vehicle 100.

At block S2, the onboard device 3 determines whether the speed of the vehicle 100 exceeds a speed threshold. When it is determined that the speed of the vehicle 100 exceeds the speed threshold, block S3 is implemented.

In one embodiment, the speed threshold may be an empirical value. For example, the speed threshold can be determined based on the speed that caused a large number (such as two thousand) of vehicles to derail due to overspeeding. For example, the speed threshold can be determined by an average speed of a portion of all of the vehicles that have derailed or all of the vehicles that have derailed.

At block S3, when the speed of the vehicle 100 exceeds the speed threshold, the onboard device 3 obtains the speed limit of the vehicle 100 in the corresponding section of road based on the images. Block S3 may be implemented according to different embodiments.

In a first embodiment of block S3, the speed limit of the vehicle 100 in the corresponding section of road is obtained by obtaining an image including a speed limit sign, cutting out an area of the image where the speed limit sign is located from the image, and identifying the speed limit from the speed limit sign in the cut out area of the image to obtain the speed limit of the vehicle.

In one embodiment, the onboard device 3 may obtain the images of the corresponding section of road in the forward direction of the vehicle 100 from the driving data 37 of the driving recorder 34, and first use an image recognition algorithm to obtain the image of the corresponding section of road. The image including the speed limit sign is identified, and then the image recognition algorithm is used to identify an area of the image where the speed limit sign is located, and finally the area of the image where the speed limit sign is cut out and captured.

The image recognition algorithm may be a template matching method. For example, images of speed limit signs of various styles (such as circles, rectangles) can be used as multiple different templates, and each template can be matched with the obtained images to confirm whether the images include a speed limit sign. For example, the feature recognition method can be used to determine whether the obtained image includes image features of the speed limit signs in various templates. For example, the image features of different types of speed limit signs can be obtained from each template, and then the speed limit signs in the images of the corresponding sections of road can be identified according to the image features of the different types of speed limit signs.

If the image of the corresponding section of road includes a speed limit sign and a corresponding template matches an area in the image including the speed limit sign, it is determined that the speed limit sign is included in the area of the image, and the area of the image where the speed limit sign is located is cut out from the image by an image interception method.

In one embodiment, an image recognition algorithm may be used to identify the speed limit of the vehicle 100 from the area of the image where the speed limit sign is located.

The image recognition algorithm may be an optical character recognition algorithm, such as the Radon transform, to perform text correction on text information of the cut out area of the image, and then the text information (such as numbers, English letters) in the text information can be extracted, so that the speed limit in the speed limit sign can be determined.

In a second embodiment of block S3, the speed limit of the vehicle 100 in the corresponding section of road based on the images is obtained by obtaining a track image of a track where the vehicle 100 is located, calculating a track path based on the track image, calculating a track bending angle of the track based on the track path, and obtaining the speed limit according to the track bending angle.

In one embodiment, the track image of the track where the vehicle 100 is located can be obtained from the driving data 37, and the track path in the track image can be identified by using an image recognition algorithm, such as an OpenCV recognition algorithm. For example, the image of the track can be imported as a grayscale image, the grayscale image can be binarized, and then pixels of the binarized image can be scanned and summed by column to obtain the track path. It should be noted that the track path is usually curved.

It should be noted that the track bending angle is also a bending angle of a curve of the track path. The curve of the track path is used to calculate the bending angle, the bending angle is used to calculate an angular velocity, and the angular velocity is used to calculate the speed limit.

In a third embodiment of block S3, the speed limit of the vehicle 100 in the corresponding section of road based on the images is obtained by training a database using training samples, obtaining a track image, and obtaining the speed limit of the vehicle 100 is based on the track image according to the database.

The database may be an image classifier trained by the onboard device 3 based on Python language using a large number of training samples. For example, the onboard device 3 may collect a preset number (such as 100,000) of training samples. Each training sample includes a track image and a speed limit corresponding to each track image, and the database is trained by a neural network using the training samples, thereby obtaining the database. Then, the speed limit corresponding to each track image can be obtained according to the third embodiment or other embodiments of block S3.

In a fourth embodiment of block S3, the onboard device 3 sets a lowest speed limit of speed limits obtained by the first through third embodiments as the speed limit of the vehicle 100 in the corresponding section of road.

At block S4, the onboard device 3 determines whether the speed of the vehicle 100 exceeds the speed limit. When it is determined that the speed of the vehicle 100 exceeds the speed limit, block S5 is implemented.

At block S5, the onboard device 3 issues a warning.

In one embodiment, the onboard device 3 may use the display 36 to issue the warning, and the display 36 may issue the warning by displaying a warning pattern or emitting a warning sound. In other embodiments, other devices (such as speakers or the like) may be used to issue the warning. In addition, a warning can also be sent to a preset terminal device (such as a mobile phone of a designated user).

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A vehicle driving assistance method comprising:
   detecting a speed of a vehicle;
   obtaining a speed limit of the vehicle in a corresponding section of road based on images in response that the speed of the vehicle exceeds the speed threshold, comprising: obtaining a track image of a track where the vehicle is located and calculating a track path based on the track image; calculating a track bending angle of the track based on the track path; and obtaining a speed limit according to the track bending angle; and
   issuing a warning when the speed of the vehicle exceeds the speed limit of the vehicle in the corresponding section of road.

2. The vehicle driving assistance method of claim 1, further comprising:
   determining the speed limit obtained according to the track bending angle as the speed limit of the vehicle in the corresponding section of road.

3. The vehicle driving assistance method of claim 1, wherein obtaining the speed limit of the vehicle in the corresponding section of road based on images further comprises:
   executing a first method, the first method comprising: obtaining an image comprising a speed limit sign, cutting out an area of the image where the speed limit sign is located from the image, and obtaining a speed limit from the speed limit sign in the cut out area of the image;
   executing a third method, the third method comprising: training a database using training samples, obtaining the track image and obtaining a speed limit based on the track image according to the database; and
   setting a lowest speed of the speed limit obtained according to the track bending angle and speed limits obtained by executing the first and the third methods as the speed limit of the vehicle in the corresponding section of road.

4. An onboard device comprising:
   at least one processor; and
   a memory storing a plurality of instructions, which when executed by the at least one processor, cause the processor to:
   detect a speed of a vehicle;
   obtain a speed limit of the vehicle in a corresponding section of road based on images in response that the speed of the vehicle exceeds the speed threshold, comprising: obtaining a track image of a track where the vehicle is located and calculating a track path based on the track image; calculating a track bending angle of the track based on the track path; and obtaining a speed limit according to the track bending angle; and
   issue a warning when the speed of the vehicle exceeds the speed limit of the vehicle in the corresponding section of road.

5. The onboard device of claim 4, wherein the processor determines the speed limit obtained according to the track bending angle as the speed limit of the vehicle in the corresponding section of road.

6. The onboard device of claim 4, wherein the processor obtains the speed limit of the vehicle in the corresponding section of road further by:
   executing a first method, the first method comprising: obtaining an image comprising a speed limit sign, cutting out an area of the image where the speed limit sign is located from the image, and obtaining a speed limit from the speed limit sign in the cut out area of the image;
   executing a third method, the third method comprising: training a database using training samples, and obtaining the track image and obtaining a speed limit based on the track image according to the database; and
   setting a lowest speed of the speed limit obtained according to the track bending angle and speed limits obtained by executing the first and the third methods as the speed limit of the vehicle in the corresponding section of road.

7. A vehicle comprising an onboard device, the onboard device comprising a memory and a processor, the processor configured to:
   detect a speed of a vehicle;
   obtain a speed limit of the vehicle in a corresponding section of road based on images in response that the speed of the vehicle exceeds the speed threshold, comprising: obtaining a track image of a track where the vehicle is located and calculating a track path based on the track image; calculating a track bending angle of the track based on the track path; and obtaining a speed limit according to the track bending angle; and
   issue a warning when the speed of the vehicle exceeds the speed limit of the vehicle in the corresponding section of road.

8. The vehicle of claim 7, wherein the processor determines the speed limit obtained according to the track bending angle as the speed limit of the vehicle in the corresponding section of road.

9. The vehicle of claim 7, wherein the processor obtains the speed limit of the vehicle in the corresponding section of road further by:
   executing a first method, the first method comprising: obtaining an image comprising a speed limit sign, cutting out an area of the image where the speed limit sign is located from the image, and obtaining a speed limit from the speed limit sign in the cut out area of the image;

executing a third method, the third method comprising: training a database using training samples, obtaining the track image and obtaining a speed limit based on the track image according to the database; and setting a lowest speed of the speed limit obtained according to the track bending angle and speed limits obtained by executing the first and the third methods as the speed limit of the vehicle in the corresponding section of road.

\* \* \* \* \*